United States Patent [19]
Goodwin et al.

[11] Patent Number: 4,904,549
[45] Date of Patent: Feb. 27, 1990

[54] BATTERY HOUSING WITH INTEGRAL LATCH AND POSITIVE DISPLACEMENT APPARATUS

[75] Inventors: Ross P. Goodwin, Chicago; Michael W. Zurek, St. Charles, both of Ill.

[73] Assignee: Motorola, Inc., Schaumburg, Ill.

[21] Appl. No.: 269,853

[22] Filed: Nov. 4, 1988

[51] Int. Cl.⁴ .................. H01M 2/10; H01M 2/02
[52] U.S. Cl. ......................... 429/97; 429/123
[58] Field of Search .............. 429/1, 123, 97, 98, 429/99, 100

[56] References Cited

U.S. PATENT DOCUMENTS

| | | | |
|---|---|---|---|
| 3,370,987 | 2/1968 | Rush | 429/98 |
| 3,864,172 | 2/1975 | Marks | 429/1 |
| 4,578,628 | 3/1986 | Siwiak | 429/97 |
| 4,680,527 | 7/1987 | Benenati et al. | 320/2 |
| 4,714,439 | 12/1987 | Marabotto et al. | 439/627 |

Primary Examiner—Donald L. Walton
Attorney, Agent, or Firm—Raymond A. Jenski; Rolland R. Hackbart

[57] ABSTRACT

A battery housing with an integral latch and a cantilevered spring finger positive displacement mechanism is disclosed. The slide-on battery is captivated by guide rails on each side of the mating surface of the battery housing. When the battery is properly located, a torsion bar latch locks the battery in place. When the latch is activated by the user to remove the battery, cantilevered spring fingers force the battery housing away from its locked position.

16 Claims, 4 Drawing Sheets

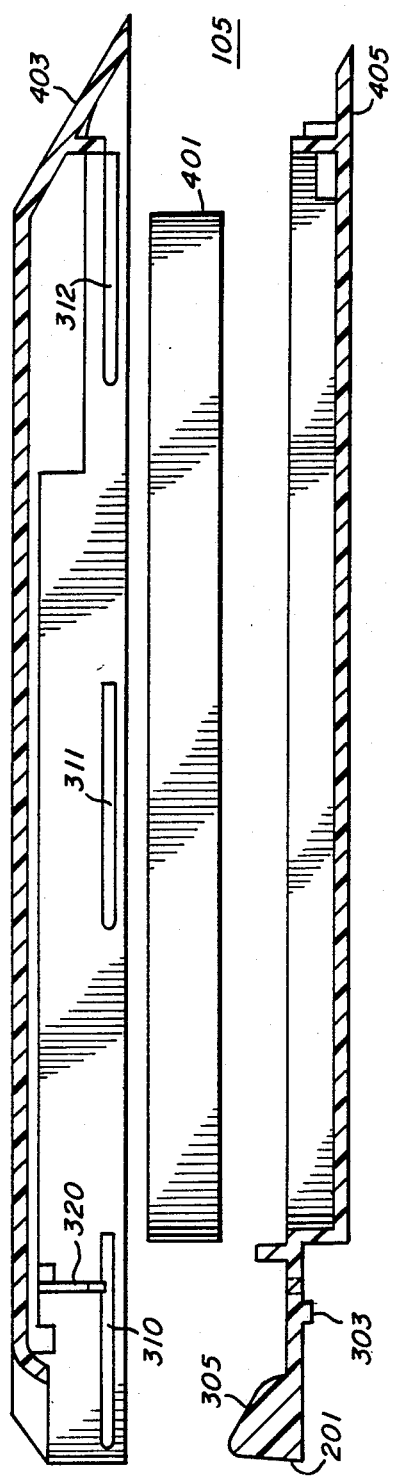
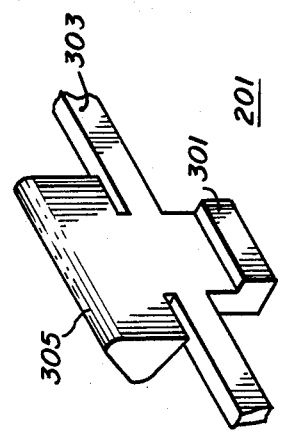
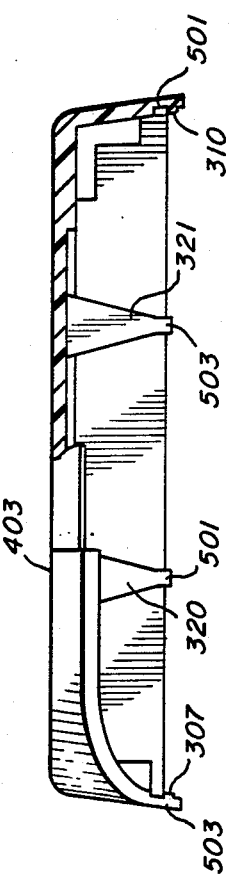
FIG. 4
FIG. 5
FIG. 6

BATTERY HOUSING WITH INTEGRAL LATCH AND POSITIVE DISPLACEMENT APPARATUS

BACKGROUND OF THE INVENTION

This invention relates generally to battery housing apparatus and more particularly to an integral battery housing assembly which has an integral latching mechanism and integral spring fingers to provide positive displacement of the battery when the latch mechanism is disengaged. This invention is related to U.S. patent application Ser. No. 07/267,415 filed on behalf of Michael W. Zurek et al. on the same date herewith.

Miniature electronic equipment is often portable in nature and, as such, requires a portable source of power such as a battery. A battery supply may be conveniently attached to the housing of the miniature electronic equipment and make electrical contact by way of a conventional connector. To make battery changing easier, mechanisms have been devised to enable the user to easily disconnect a spent battery and replace it with a freshly charged battery. It has been proven desirable to securely affix the detachable battery to the miniature electronic equipment by way of some sort of latching mechanism. As the equipment becomes smaller, however, volume within the miniature electronic equipment cannot be afforded for extensive latching mechanisms. Thus, it would be advantageous for latching mechanisms to be placed in locations other than within the miniature electronic equipment.

SUMMARY OF THE INVENTION

It is, therefore, one object of the present invention to provide a battery housing utilizing an integral latch mechanism.

It is another object of the present invention to utilize cantilevered spring fingers integral to the battery housing to provide a positive displacement of the battery when the latch is disengaged.

It is a further object of the present invention to minimize binding of the battery housing during installation and disengagement.

Accordingly, these and other objects are realized in the present invention which encompasses a unique battery housing having integral latch and positive displacement spring fingers to enable easy installation and removal of the battery.

BRIEF DESCRIPTION OF THE DRAWINGS

FIG. 4 is an exploded view of the battery of FIG. 2A.

FIG. 5 is a view of the cantilevered spring fingers which may be used in the battery housing of FIG. 2A.

FIG. 6 is an isometric view of the latch mechanism of the battery housing of FIG. 3.

DESCRIPTION OF THE PREFERRED EMBODIMENT

Figure 1:
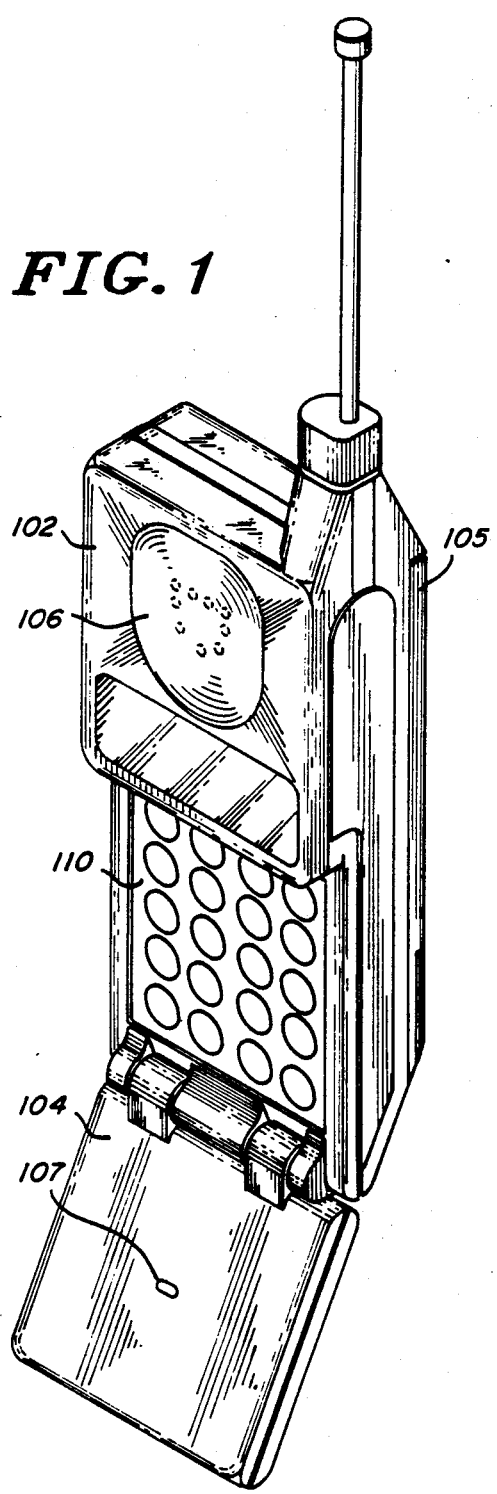
FIG. 1 is an isometric drawing of a hand-held portable radiotelephone which may employ the present invention.

A portable radiotelephone adapted to be used in a cellular radiotelephone system is shown in FIG. 1. The present invention may be employed in such a portable radiotelephone as well as in other miniature electronic equipment. The illustrated portable unit consists of two external portions, a body portion 102 and a flip element portion 104, in addition to a detachable battery 105. The drawing of FIG. 1 shows the flip element 104 in an "open" position such that a user of the portable unit may listen via earpiece 106 and may speak into a microphone 107. A telephone dial, or keypad, 110 consists of a plurality of buttons numbered one through zero, #, and *, in a familiar telephone arrangement. The keypad 110 also has additional function buttons such as "send", "end", "on/off", and other buttons associated with telephone number recall.

Since the portable radiotelephone of FIG. 1 is indeed portable, some source of electrical energy is necessary to power the electrical functions of this radiotelephone. The source of this electrical energy is a battery 105 which is typically implemented as a rechargeable electrochemical cell or cells. It is expected that the user will be able to either recharge the battery while the battery is attached to the radio or detach the battery from the radio and charge it separately.

Figure 2A:
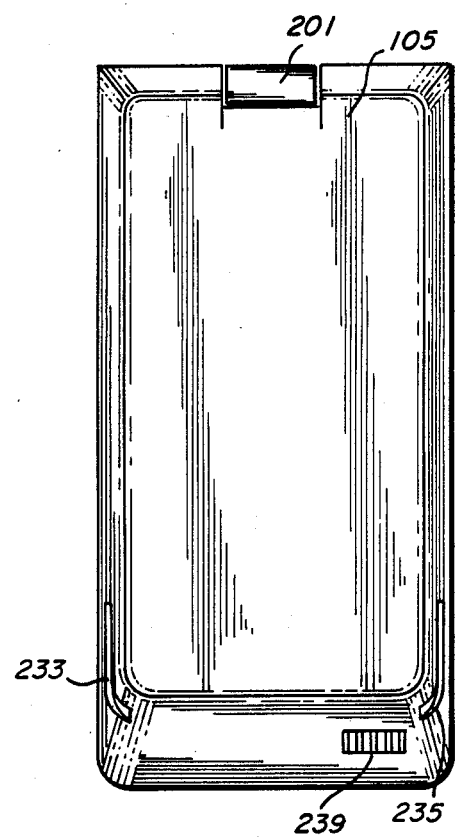
FIGS. 2A and 2B are drawings of a battery housing (FIG. 2A) and portable radiotelephone (FIG. 2B) in which the battery has been detached from the portable radiotelephone.
Figure 2B:
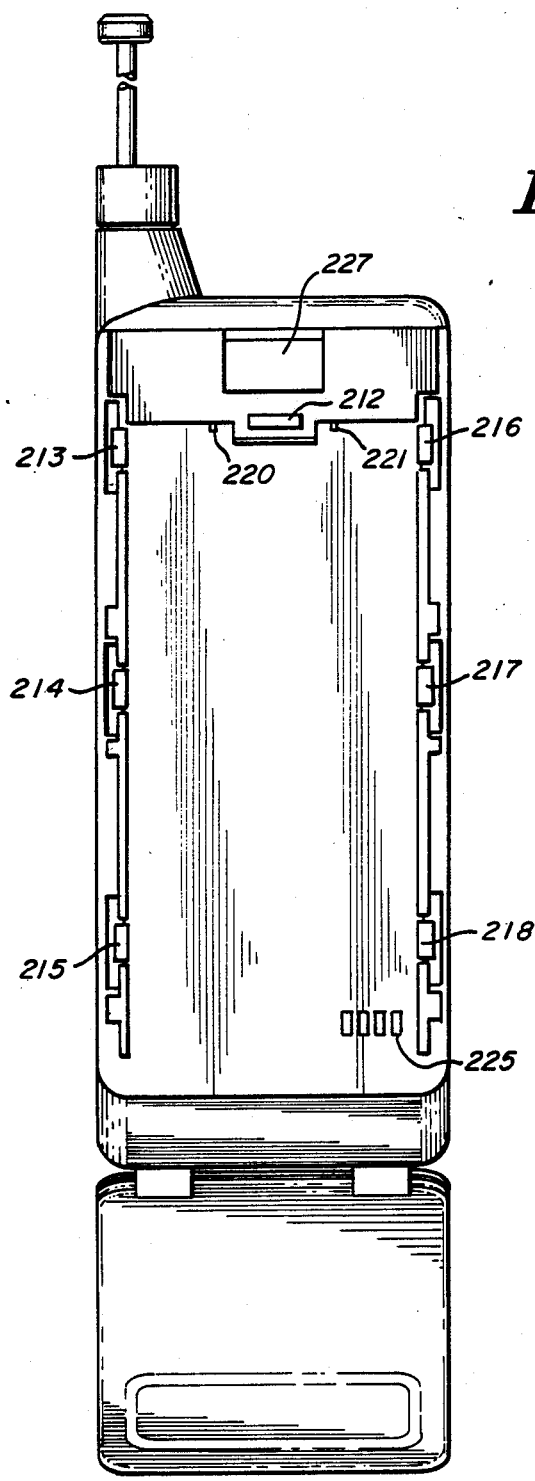

Referring now to FIG. 2A, the configuration of the detachable battery 105 can be apprehended in the condition where the battery 105 is detached from the portable radiotelephone of FIG. 1. An integral latch mechanism 201 is integrally molded on the battery housing. (In the preferred embodiment of the present invention, battery housing consists of two halves which are permanently affixed together. The latch mechanism is molded into the inside half of the plastic housing). To disengage the battery 105 from the portable radiotelephone 102, the latch mechanism 201 is pushed at the portion visible in FIG. 2A thereby causing a torsion beam (not shown) to rotate and cause a catch (not shown) to retract from a pocket 212 in the portable radiotelephone 102. (The portable radiotelephone 102, in a rear elevation view with the battery removed, is shown in FIG. 2B). This action releases the battery from its locked position and enables the battery housing 105 to be removed from the portable radiotelephone 102. The mating surface of the portable radiotelephone 102 has a pocket or intended slot 212 which is so formed and positioned that it engages the catch portion of latch mechanism 201 when the battery housing 105 is located in its fully attached position. The battery housing is thereby locked in place. Guide rails 213 through 218 extend from a surface of the portable radiotelephone housing 102 and are disposed opposite similar guide rails on the battery housing 105. The guide rails of the battery housing 105 are captivated beneath guide rails 213 through 218 of the portable radiotelephone housing 102 when the battery housing 105 is in its operational (and locked) position. The optional position is, of course, when electrical contacts 225 have contacted mating contacts 325 (not visible) of the battery housing 105. Also visible in FIG. 2B are two molded flanges 220 and 221 which provide surfaces useable for preloading cantilevered springs enabling positive displacement of the battery housing 105 when it is unlocked.

Lateral slots 233 and 235 in FIG. 2A on opposite sides of the battery housing assembly 105 are located in a position such that the battery alone or the battery and portable radiotelephone together may slide into a common battery charging unit and be properly oriented relative to the battery charging contacts 239.

Figure 3:
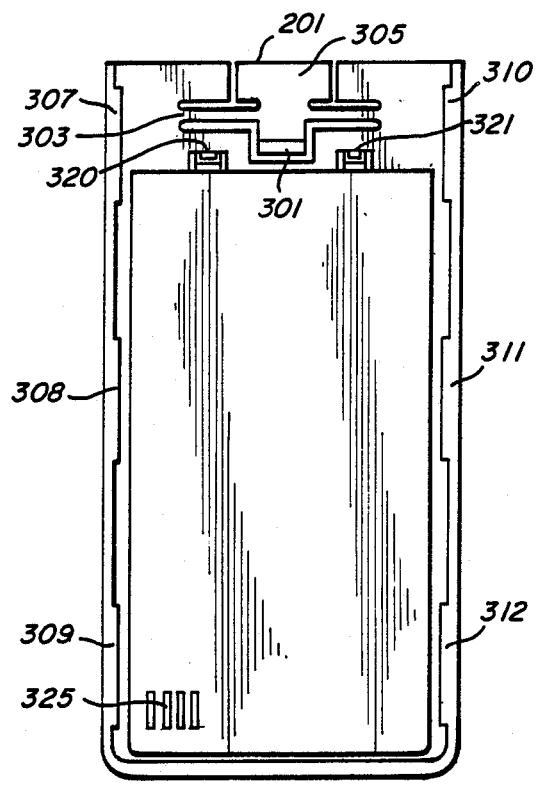
FIG. 3 is a view of the mating service of the battery of FIG. 2A showing the integral latch, positive displacement, cantileverd spring fingers, and reduced travel guide rails of the present invention.

The surface of the battery housing 105 which mates to the portable radiotelephone of FIG. 2B is shown in the elevation view of the mating surface of FIG. 3. The latch mechanism 201 is seen in greater detail and it can be perceived how the catch 301 rotates about the torsion bar 303 when the button portion 305 is pressed by the user to remove the battery. An isometric view of the latch mechanism is shown in FIG. 6. Such a button pressing in a direction out of the plane of the page of FIG. 3 (and into indented area 227 of the portable radiotelephone housing 102) causes torsion bar 303 to rotate and move catch 301 into the plane of the page of FIG. 3. This motion disengages the catch 301 from slot 212 (shown in FIG. 2B) thereby unlocking the battery housing and enabling the user to slide the battery along guide rails 307 through 312. Once guide rails 307 through 312 have moved past the opposing guide rails 214 through 219 on the portable radiotelephone housing 102, the battery 105 may be lifted clear of the portable radiotelephone 102.

To aid in battery removal, cantilevered spring fingers mechanically load the battery when the battery is in the inserted and locked position. Referring again to FIG. 3, two spring fingers in the preferred embodiment are shown as spring fingers 320 and 321. When the battery is in place, spring fingers 320 and 321 on the battery housing are deflected downward by tabs 220 and 221 located on the portable radiotelephone housing 102. This downward deflection of spring fingers 320 and 321 provide a positive displacement of the battery when the latch mechanism 201 is activated by the user. The battery, therefore, begins its disengagement when the user presses the latch mechanism and the battery slides downward enabling guide rails 307 through 312 to partially disengage from guide rails 215 through 218 on the portable radiotelephone housing. The guide rails are formed from raised protuberances on the inside surfaces of the lip edges which are raised slightly above the battery housing surface which faces the portable radiotelephone. When guide rails 307 through 312 are fully disengaged from the portable radiotelephone housing, the battery electrical contacts 325 are disengaged from the battery input electrical contacts 225 on the portable radiotelephone housing.

An exploded sectional view of the battery housing is shown in FIG. 4. In this diagram it can be seen that a conventional set of electrochemical battery cells 401 may be sandwiched between and captivated by two plastic housing portions 403 and 405 which may be secured together to from an integral battery housing package. It should be noted that the latch mechanism 201 is molded as part of the plastic portion 405 and the cantilevered spring fingers 320 and 321 are molded as part of plastic portion 403 to minimize cost and reduce the volume required to implement the latching and positive displacement features of the present invention. In the preferred embodiment, three guide rails 310, 311 and 312 are located on one side of the battery housing and three guide rails (307, 308 and 309 not shown) are located on the other side of the battery housing. These shortened guide rails with gaps in between each enable secure fastening of the battery housing 105 to the portable radiotelephone housing 102 the entire length of the battery housing 105 while allowing a short travel displacement of the battery housing before the battery housing may be disengaged and removed from the portable radiotelephone 102.

FIG. 5 shows a cross-section of housing portion 403 which more clearly shows the spring fingers 320 and 321 as well as guide rails 310 and 307. It can be seen that lip edges 501 and 503, on opposite sides of the battery housing, are raised slightly above the plane of the surface of the battery housing which mates with the portable radiotelephone. In the cross-section shown in FIG. 5, the protuberances which form guide rails 310 and 307 are visible on the inside surface of the raised lips 501 and 503 respectively. In the preferred embodiment, each spring finger is a cantilevered trapezoidal shaped beam emanating at one end from the housing portion 403 and ending at the opposite end with a rectangular shaped target areas 501 and 503 each of which contacts the flanges 220 or 221 of the portable radiotelephone housing. Also in the preferred embodiment, the housing portion 403 is molded from polycarbonate plastic or similar material and each spring finger is 0.13 cm thick, and having a width at the point of attachment to the housing portion 403 of 0.51 cm and narrowing to a target area of 0.13 cm. The length of the spring finger is 0.69 cm from the point of attachment to the beginning of the rectangular target area. Each spring finger provides 1.87 lbs. of preload to the battery housing relative to the portable radiotelephone housing.

In summary, then, a battery assembly having an integral latch mechanism, cantilevered spring fingers to provide positive displacement when the latch is disengaged, and reduced travel guide rails to provide short travel between the engaged and disengaged position of the battery housing on a portable radiotelephone has been shown and described. While a particular showing and description is contained herein, it is to be understood that the invention is not to be taken as limited to the specific embodiment herein and that changes and modifications may be made without departing from the true spirit of the invention. It is therefore contemplated to cover the present invention, and any and all such changes and modifications, by the appended claims.

We claim:

1. A slide-on battery housing for a portable radiotelephone, enclosing electrochemical cells and having at least one surface by which the battery housing assembly is attached to the portable radiotelephone, the battery housing comprising:

a latch mechanism attached to the battery housing for locking the battery housing to the portable radiotelephone;

at least one positive displacement spring finger mechanism disposed on the attaching surface of the battery housing and cantilevered in a direction perpendicular to the plane of the attaching surface; and at least two guide rails on the attaching surface of the battery housing for securing the battery housing to the portable radiotelephone further comprising:
 (a) lip portions perpendicular to the plane of the attaching surface and on opposing edges of the attaching surface extending at least part of the length of said opposing edges and
 (b) at least one elongated protrusion on facing surfaces of each said lip portion and extending along each said lip portion parallel to the plane of the attaching surface.

2. A battery housing for a portable radiotelephone having at least two mating housing portions securing electrochemical cells therebetween and having at least one surface by which the battery housing may be detachably connected to the portable radiotelephone further comprising:
 (a) an elongate beam element supported at each end to form a torsion bar,
 (b) a push button lever element disposed perpendicularly to the center line of said torsion bar and between the two ends of said torsion bar, and
 (c) a catch element lever disposed perpendicularly to the centerline of said torsion bar and between the ends of said torsion bar;
 at least one positive displacement spring finger mechanism disposed on the connecting surface of the battery housing; and
 at least two guide rails on the connecting surface of the battery housing for securing the battery housing to the portable radiotelephone.

3. A battery housing in accordance with claim 2 further comprising said latch mechanism disposed on a first of the at least two mating housing portions and said positive displacement spring finger mechanism disposed on a second of the at least two mating housing portions.

4. A battery housing in accordance with claim 2 wherein said push button lever element is disposed essentially at the midpoint between the two ends of said torsion bar.

5. A battery housing in accordance with claim 2 wherein said catch element lever is disposed essentially at the midpoint between the ends of said torsion bar.

6. A battery housing in accordance with claim 2 wherein said catch element lever is disposed opposite said push button lever element.

7. A battery housing in accordance with claim 2 wherein the connecting surface of the battery housing is an essentially planar surface.

8. A battery housing in accordance with claim 7 wherein said positive displacement spring finger is further cantilevered in a direction perpendicular to the plane of the connecting surface.

9. A battery housing for a portable transceiver, enclosing electrochemical cells and having at least one surface by which the battery housing assembly is attached to the portable transceiver, the battery housing comprising:
 a latch mechanism attached to the battery housing for locking the battery housing to the portable transceiver;
 a positive displacement mechanism disposed on the attaching surface of the battery housing; and
 at least two guide rails on the attaching surface of the battery housing for slideably securing the battery housing to the portable transceiver.

10. A battery housing in accordance with claim 9 wherein said latch mechanism further comprises:
 an elongate beam element supported at each end to form a torsion bar;
 a push button lever element disposed perpendicularly to the center line of said torsion bar and between the two ends of said torsion bar; and
 a catch element lever disposed perpendicularly to the centerline of said torsion bar and between the ends of said torsion bar.

11. A battery housing in accordance with claim 10 wherein said push button lever element is further disposed essentially at the midpoint between the two ends of said torsion bar.

12. A battery housing in accordance with claim 10 wherein said catch element lever is disposed essentially at the midpoint between the ends of said torsion bar.

13. A battery housing in accordance with claim 10 wherein said catch element lever is disposed opposite said push button lever element.

14. A battery housing in accordance with claim 9 wherein said attaching surface of the battery housing is an essentially planar surface.

15. A battery housing in accordance with claim 14 wherein at least one said guide rail further comprises:
 lip portions perpendicular to the plane of the attaching surface and on two opposing edges of the attaching surface extending at least part of the length of said opposing edges and
 at least one elongated protrusion on facing surfaces of each said lip portion and extending along each said lip portion parallel to the plane of the attaching surface.

16. A battery housing in accordance with claim 14 wherein said positive displacement mechanism further comprises a spring finger cantilevered in a direction perpendicular to the plane of the attaching surface.

* * * * *